Nov. 15, 1966    M. E. JUNION    3,285,447
SHOP TRUCK
Filed April 17, 1964
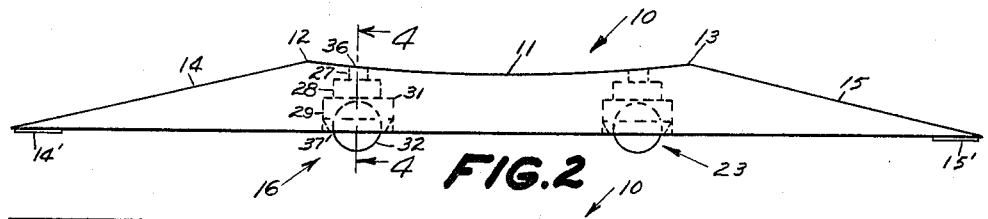
FIG.2
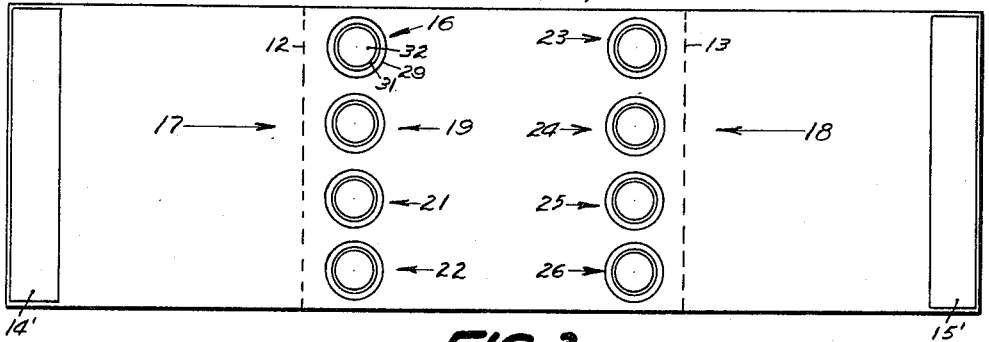
FIG.3
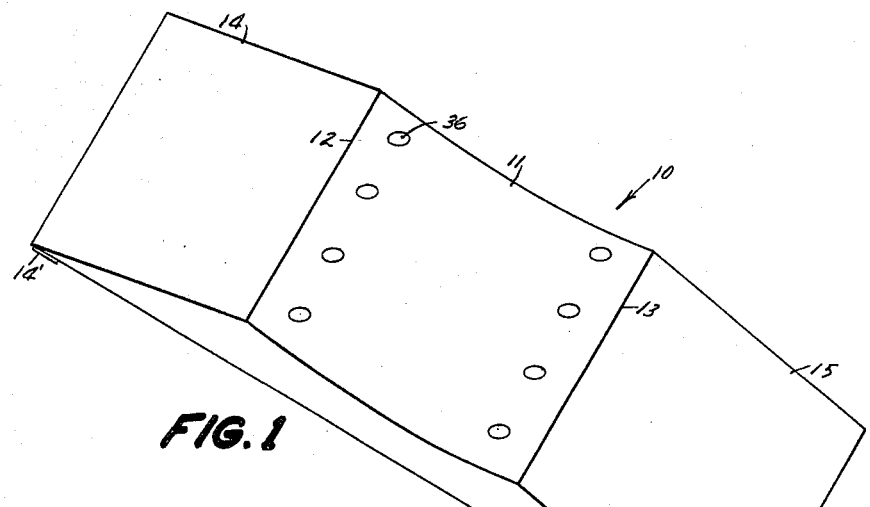
FIG.1
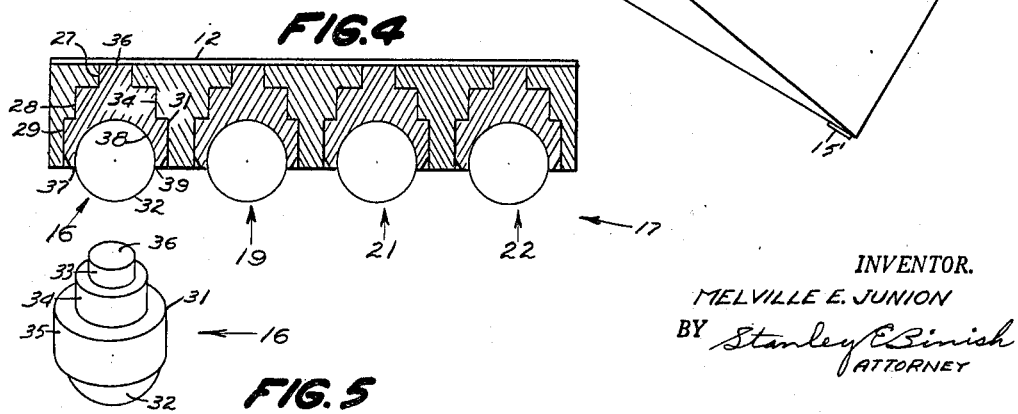
FIG.4
FIG.5
INVENTOR.
MELVILLE E. JUNION
BY Stanley C. Binish
ATTORNEY

United States Patent Office 3,285,447
Patented Nov. 15, 1966

3,285,447
SHOP TRUCK
Melville E. Junion, 823 N. State St., Appleton, Wis.
Filed Apr. 17, 1964, Ser. No. 360,657
5 Claims. (Cl. 214—506)

This invention relates generally to shop trucks, and more particularly to a shop truck having a platform supported on ball type casters.

The purpose of this invention is to provide a shop truck adapted for handling heavy rolls, for example, paper rolls in a paper mill or in a printing establishment, or the like, without the use of conventional rollers, wheels or shafts in the construction thereof.

An object of this invention is the provision of a shop truck that is low, strong, cmopact, and upon which heavy objects may be readily rolled, and conveniently moved about.

Another object is to provide a shop truck supported on casters subject to compressive forces, only.

Still another object is to provide a shop truck design that avoids harmful bending stresses in the casters thereof, such as entailed in the conventional casters embodying horizontal and vertical shafts.

Yet another object of this invention is the provision of a shop truck rollably supported on steel balls for maximum swivel action.

A further object is to provide a shop truck having ball casters each having only one bearing, and that bearing being fixed and embedded in the truck platform.

Still a further object of this invention is the provision of a shop truck supported on casters turnable in any direction whatsoever, yet having only one moving element.

Yet a further object is to provide a shop truck supported on casters, tiltable in any direction without eccentrically loading the casters.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is an isometric view of a shop truck constructed in accordance with one embodiment of this invention;

FIG. 2 is a side elevation view of the shop truck shown in FIG. 1;

FIG. 3 is a bottom view of the shop truck shown in FIG. 1;

FIG. 4 is an enlarged section view taken on the line 4—4 of FIG. 2; and

FIG. 5 is an isometric view of the ball caster, per se.

Referring now to the drawings, wherein like reference characters designate like or corresponding parts throughout the several views, there is shown an elongated rectangular, flat bottomed, metallic plate platform, generally indicated at 10, having a central portion the top side of which is arcuately recessed, as at 11, said recess extending transversely across said elongated platform, to the side edges thereof, to provide a receiving saddle for a roll of paper, or the like. Said arcuate recess terminates in spaced arrises 12 and 13 formed by the intersection of the arcuate recess surface with the top surface of the plate platform 10. A plate platform thickness of one and one-half inches, at the arrises, has been found satisfactory, however, the invention is not limited to said thickness.

Each end portion of said rectangular elongated platform 10 comprises a plane ramp 14 and 15, respectively, declining from said arrises, respectively, and terminating at the bottom surface of said plate platform. Said ramp presents a relatively long slope or way, inclined at a flat angle, so that heavy rolls of paper can be easily and conveniently rolled up thereon and into said saddle 11. A ramp slope of 10° to the horizontal has been found satisfactory for use with heavy paper mill rolls, however, the invention is not limited to said degree of incline.

Friction strips of rubber, or the like, as indicated at 14' and 15', are cemented to the underside of the platform 10, at the ramp ends thereof, respectively, to hold the truck against sliding and moving when a roll of paper is being rolled up either of said ramps.

Ball casters, such as indicated generally at 16, are mounted and embedded in said solid plate platform 10, and project from the bottom side of said platform, to rollably support said platform.

Said ball casters are arranged in two spaced rows, such as indicated generally at 17 and 18, disposed transversely of the longitudinal axis of said elongated platform and adjacent to and parallel with and inwardly of said arrises, respectively, and under the arcuate recess 11. Each row comprises four ball casters, equally spaced.

Row 17 comprises casters generally indicated at 16, 19, 21 and 22.

Row 18 comprises casters generally indicated at 23, 24, 25 and 26.

In view of the fact that the ball casters are all of the same construction and similarly mounted, a description of the structure of one of such ball casters and its mounting and embodiment in the platform will suffice for all.

Ball caster 16 is mounted and embedded in the platform by means of a bore, such as indicated at 27, see FIGS. 2 and 4, extending entirely through said platform, that is from the bottom surface to the top surface of said platform. Said bore 27 is intermediately counterbored and enlarged as at 28; and further enlarged and counterbored as at 29. Said counterbore 29 extends to the bottom surface of the platform. Said enlarging counterbores provide bearing shoulders for ball caster 16 as hereinafter described.

Ball caster 16 comprises a generally cylindrical housing 31, conformable with and receivable in said counterbored opening, and a ball 32 rollably seated and contained in said housing, and projecting therefrom for engagement with a floor, see FIG. 5.

The housing comprises stepped-up configured riser portions 33, 34 and 35 and connecting tread or shoulder portions engageable with the sides of counterbores 27, 28 and 29 and their connecting counterbore bearing shoulder portions respectively. Said housing 31 is secured, as by press-fit, in said counterbored opening, but can be secured therein by any suitable means.

The top end of the mounted and embedded housing terminates substantially flush with the top surface of the platform, as at 36.

The bottom end of the mounted and embedded housing 31 terminates substantially flush with the bottom surface of the platform, as at 37.

Said housing 31 is provided with a concave recess 38, to conform with and seatably receive approximately the upper one-half portion of said ball 32, the ball being rollably seated and contained therein. The recess extends upwardly from the lower end of the housing, and said ball, while rollably seated in said housing, extends outwardly of said housing, and beyond the bottom surface of the platform, a distance equal to approximately one-half the diametral dimension of the ball 32. To insure the ball being held contained in said concave recess, the lower end portion of the housing can be forced and bent toward and into sliding engagement with the ball, below the equator of the ball, as at 39.

In the event the caster becomes damaged and needs to be repaired or replaced, a force can be applied to the top end 36 of the housing 31 and the press-fit housing forced therefrom.

Obviously, in lieu of the housing being removably mounted and embedded in the counterbored opening, said housing can be cast embedded directly in the platform should the platform be poured and cast.

The platform can be made of any one-piece, solid or rigid material, or fabricated of solid or rigid members, in which the ball casters are to be embedded.

In operation, when a large roll of paper, or the like, is to be moved or transported from one place to another, the heretofore described platform truck is rolled or otherwise disposed adjacent the periphery of the roll, centrally thereof. As the roll of paper is rolled toward the truck it engages the end of the ramp and forces it downwardly against the floor, pivoted on the adjacent row of ball casters, such as row 17, the opposite end of the platform and caster row 18 being thereby lifted upwardly off the floor. In this tilted position the truck is supported at the ramp end, by the floor, and by the caster row 17. As the roll of paper is rolled up the ramp, it reaches arris 12 and thence rolls into the saddle 11 and comes to rest and is seated therein. As the paper roll is rolled into said saddle, the remote end of the tilted truck is forced downwardly, and the remote caster row 18 is forced back onto the floor, whereby the truck platform is now horizontally disposed and both rows of caster balls operably engaged with the floor. The platform truck and paper roll load thereon can now be rollably moved about on the supporting balls. It is to be noted that the tilted truck platform does not drop back to the floor until the roll passes over the arris 12 and is safely in the first reaches or side edge portions of the saddle or recess 11.

When the roll of paper is to be unloaded from the truck, the truck is held by a conventional roll stopper, and a pushing force applied to the roll of paper, to roll the paper roll from the center of saddle 11 toward a side edge thereof and onto the declining ramp. As the roll of paper approaches the arris 12, and while the roll of paper is still resistably under control of the operator, that is in the saddle 11 portion between the row of balls 17 and the arris 11, the truck tilts, pivoting on the roll of balls 17. Additional pushing on the roll of paper moves it over the arris 12 and unto the ramp 14, down which it rolls by gravity. It is to be noted that the truck tilts to an unloading position while the roll of paper is still safely in the saddle and resistably under control. It is further to be noted that the tilting of the truck and its impact against the floor provides an aural indication and warning to the operator, that, though the massive roll of paper is presently under resistance control by the operator, it is nevertheless disposed at the brink of the ramp and about to proceed down the ramp, by gravity, free rolling, and uncontrolled.

Some characteristic features of this invention are the provision of a platform truck supported on ball type casters; the provision of a platform truck supported on ball casters the bearings of which are embedded in the load platform of the truck; the provision of a platform truck the casters of which are subject to compressive forces only; the provision of platform truck supported on casters, the casters comprising only a bearing housing rollably containing a ball seated therein, the bearing housing being embedded in the platform of the truck; and the provision of a platform truck having a recess for receiving a roll of paper, a ramp declining therefrom, and casters for rollably supporting said platform truck, said casters being disposed under said platform truck and inwardly of the side edges of said recess or saddle.

Obviously many modifications and variations of the present invention are possible in the light of the above teachings. It is therefore to be understood, that within the scope of the appended claims, the invention may be practiced otherwise than as specifically described.

What is claimed and desired to be protected by Letters Patent of the United States is:

1. A platform truck, comprising: an elongated platform having a transverse arcuate recess in the top side and disposed centrally thereof and extending across said platform, said arcuate recess forming a pair of spaced parallel arrises at the intersection of the arcuate recess surface with the top side surface of the platform, and inclined ramps at the ends of said platform, respectively, leading from said arrises downwardly to the ends of said platform adjacent the bottom surface of said platform; a pair of spaced rows of openings in said platform, extending upwardly from the bottom surface to the top surface of said platform, said rows being disposed transversely of said elongated platform and symmetrically about the transverse axis of said elongated platform and spaced inwardly of said arrises; ball type caster means in said openings for rollably supporting said platform, said ball type caster means comprising a bearing housing means rollably seating and containing the caster balls, said bearing housing means being fixed in said openings, said balls projecting from said bearing housing means and beyond the bottom surface of the platform for engagement with a floor.

2. The apparatus of claim 1 wherein the openings are counterbored to provide shoulders, and said bearing housing means is provided with shoulders for engagement with the above said shoulders in said openings.

3. A platform truck, comprising: an elongated support platform having a transverse arcuate recess in the top side, disposed centrally thereof, and extending across said platform, said arcuate recess forming a pair of spaced parallel arrises at the intersection of the arcuate recess surface with the top side surface of the platform, and inclined ramps at the end of said platform, respectively, leading from said arrises downwardly to the ends of said platform; a pair spaced rows of casters secured to said platform for rollably supporting said platform, said rows being disposed transversely of said elongated platform and symmetrically about the transverse axis of said elongated platform and spaced inwardly of said arrises.

4. The apparatus of claim 3 wherein the arcuate recess at the arrises is arcuated so that when the ramps operatively engage a floor the arcual surface at the arrises is inclined upwardly.

5. A platform truck, comprising: an elongated platform having a transverse arcuate recess in the top side and disposed centrally thereof and extending across said platform, said arcuate recess forming a pair of spaced parallel arrises at the intersection of the arcuate recess surface with the top side surface of the platform, and inclined ramps at the ends of said platform, respectively, leading from said arrises downwardly to the ends of said platform adjacent the bottom surface of said platform; a pair of spaced rows of openings in said platform, extending upwardly from the bottom surface to the top surface of said platform, said rows being disposed transversely of said elongated platform and symmetrically about the transverse axis of said elongated platform and space inwardly of said arrises; ball type caster means in said openings for rollably supporting said platform, said ball type caster means comprising a bearing housing means rollably seating and containing the caster balls, said bearing housing means being fixed in said openings, said balls projecting from said bearing housing means and beyond the bottom surface of the platform for engagement with a floor; wherein said openings are counterbored to provide shoulders, and said bearing housing means is provided with shoulders for engagement with the above said shoulders in said openings; and wherein said bearing housing extends from the bottom surface to the top surface of the support platform to facilitate driving removal of the bearing housing from the support platform.

References Cited by the Examiner

UNITED STATES PATENTS

| | | | |
|---|---|---|---|
| 78,850 | 6/1868 | Wilkinson | 16—24 |
| 123,147 | 1/1872 | Blackman | 16—24 |
| 806,599 | 12/1905 | Thibault | 214—334 |
| 2,830,824 | 4/1958 | Young | 280—79.1 |

GERALD M. FORLENZA, *Primary Examiner.*

ALBERT J. MAKAY, *Examiner.*